UNITED STATES PATENT OFFICE.

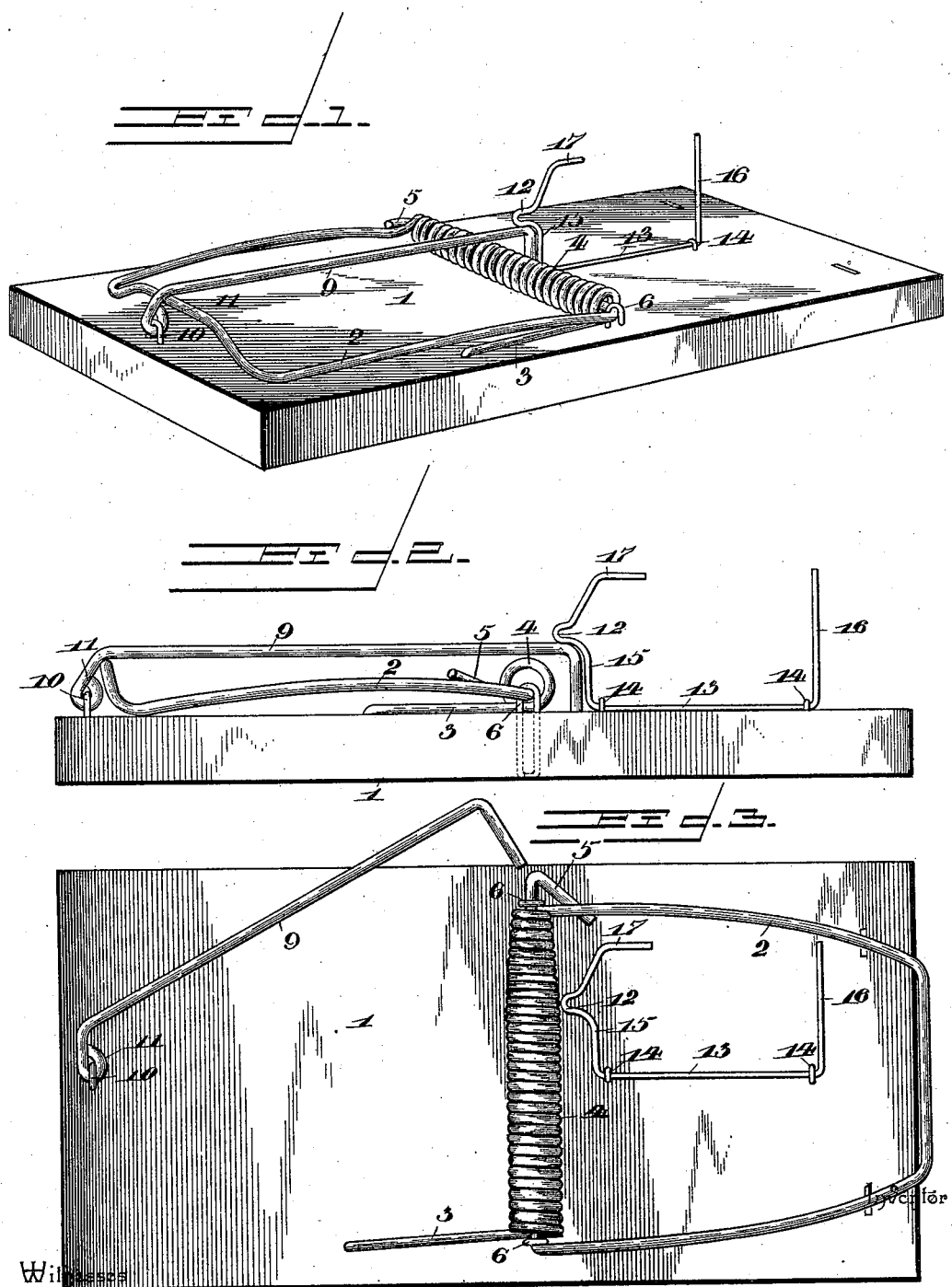

WILLIAM CHAUNCEY HOOKER, OF ABINGDON, ILLINOIS.

ANIMAL-TRAP.

SPECIFICATION forming part of Letters Patent No. 575,113, dated January 12, 1897.

Application filed September 25, 1895. Serial No. 563,630. (No model.)

*To all whom it may concern:*

Be it known that I, WILLIAM CHAUNCEY HOOKER, a citizen of the United States, residing at Abingdon, in the county of Knox and State of Illinois, have invented a new and useful Animal-Trap, of which the following is a specification.

This invention relates to an improvement in animal-traps.

The object of the present invention is to simplify and improve the construction of animal-trap described in a former patent granted to me November 6, 1894, No. 528,671.

The principal object of this invention is to provide a new construction and arrangement of trigger possessing the advantage of being capable of being covered partially or entirely with any light loose material, such as bran, whereby the rodent in passing over the trigger will invariably strike the same with its body in whichever direction it is going, thus insuring the catching of the animal.

A further object of the invention is to construct the trigger in such manner that it cannot be thrown or operated by the rodents jumping over the trap and striking the same with their tails after their bodies are out of danger.

To accomplish the objects above enumerated, the invention consists in the construction and combination of features and details of construction and arrangement of parts, as hereinafter fully described, illustrated in the drawings, and pointed out in the claims.

In the accompanying drawings, Figure 1 is a perspective view of a rat-trap constructed in accordance with my improvements and shown set. Fig. 2 is a side elevation of the same. Fig. 3 is a plan view with the trap shown sprung.

Similar numerals of reference indicate corresponding parts in the several figures of the drawings.

Referring to the drawings, the base 1 consists of a block, preferably of wood, upon which is mounted a spring-jaw 2, formed integrally with a spiral spring and adapted to be forced downward by the same upon the upper side of the base-block 1 and in contact with a rodent for catching the same. The spring-wire of which the spiral spring and the jaw are constructed is first bent to form an arm or support 3. It is then coiled into the transversely-arranged spring 4, from one end of which the wire is extended to form a loop or jaw 2, which terminates at the other end of the transverse coil 4. The wire is bent at this point, whence it passes through the longitudinal opening of the coil and terminates in an angular extension or arm 5, extending beneath the spring-jaw and serving to support the same.

The spring-jaw and its actuating-spring are hinged to the base-block 1 by means of an oppositely-disposed pair of staples 6, the shanks of which pass entirely through the base-block and are bent upward or clenched against the lower face thereof, said staples striding at their upper ends, the transversely-extending terminal of the wire passing through the longitudinal opening of the coil at either end of said coil. The outer end of the arm 3 is bent downward and inserted in the base for assisting in supporting the transverse coil.

The spring-actuated jaw 2 is propelled with sufficient strength to strike violently against the rodent, and the free or swinging end of the jaw is bent downward at an angle to the body of the jaw and just beyond the front edge of the base-block to form a grip for preventing the animal from being forced outward by the blow, said bent portion serving to securely hold the animal. The jaw 2 is held backward, when the trap is set, against the action of the transverse coil by a locking-bar 9, which passes over said jaw and which has its rear end loosely connected to the base by means of a staple 10, driven into the base-block and engaging an eye or loop 11 at the rear end of the locking-bar. The front end of the locking-bar is adapted to engage a rearwardly-extending catch 12 on a transversely-swinging pivoted trigger 13.

The trigger 13 is made from a single piece of wire, the central portion of which is straight, rests in contact with the upper face of the base-block, and extends longitudinally thereof, forming the axis on which the trigger is pivoted and being secured at or near either end by means of staples 14, driven into the base-block. Outside of said staples the wire is given an upward bend at each end, forming upright arms 15 and 16, extending upwardly an inch or so above the base-block.

The arm 15 is given a rearward bend at the proper point to form the catch 12, above referred to, and is extended upwardly above said catch and given a forward bend to form a short horizontal portion 17, adapted to receive a piece of bait and to form an obstruction against which the rodent will strike in running across and over the trap.

The construction of trigger and catch just described forms a very sensitive releasing device for the trap, the slightest pressure against either side of the trigger at any point serving to instantly spring the trap. This particular form of trigger also possesses other advantages—viz., it may be partially or entirely covered up in any light loose material, such as bran, so as not to excite the suspicion of the rodents. Furthermore, the trigger is adapted to be operated upon by the body of the rodent in passing in either direction across the trap, while at the same time it cannot easily be thrown by the rodents jumping over and above the trap and striking the same with their tails after their bodies are out of danger. The trap is adapted to be used with or without bait by setting it at the holes or in runways. If it is desired to bait the trap, a piece of cheese or other material may be placed upon the horizontal hook 17, as indicated.

The trap above described is very simple, cheap in construction, and positive and effective in operation. The trigger can be made just as sensitive as desired by flattening the forward end of the locking-arm upon its upper face to the desired extent.

Various changes in the form, proportion, and the minor details of construction may be resorted to without departing from the principle or sacrificing any of the advantages of this invention.

Having thus described the invention, what is claimed as new, and desired to be secured by Letters Patent, is—

1. A trap, comprising a stationary base, a spring-actuated jaw, a locking-bar, a trigger hinged to the base of the trap and having a longitudinally-extending journal and adapted to swing transversely in either direction, bearings at each end of said journal, the terminals of the trigger being extended upwardly, one forming a bait-hook and the other an auxiliary trip, substantially as specified.

2. A trap, comprising a base, a spring-actuated jaw thereon, a locking-bar therefor, a trigger having a longitudinally-extending journal and provided with a transversely-swinging arm, said arm having a lip for engaging the locking-bar, and a horizontal extension at the swinging end of said arm, substantially as and for the purpose described.

In testimony that I claim the foregoing as my own I have hereto affixed my signature in the presence of two witnesses.

WILLIAM CHAUNCEY HOOKER.

Witnesses:
W. C. MARKS,
I. A. HOOKER.